No. 857,876. PATENTED JUNE 25, 1907.
J. B. DUMAIS.
VEHICLE TIRE.
APPLICATION FILED NOV. 30, 1906.
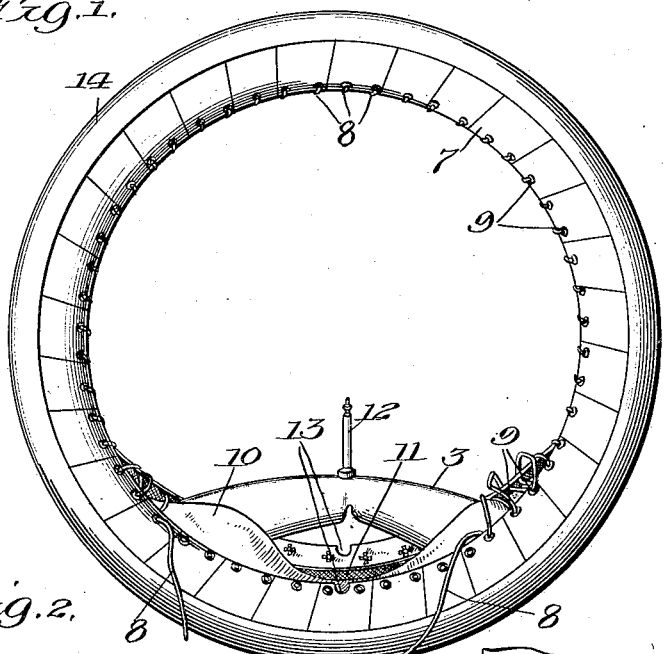
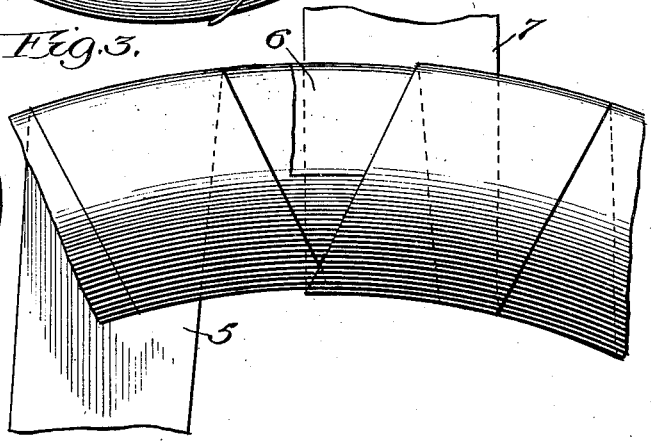
Witnesses
O. M. Menniel
George L. Chindahl
Inventor
Jean B. Dumais
By Luther L. Miller
Atty

UNITED STATES PATENT OFFICE.

JEAN B. DUMAIS, OF CHICAGO, ILLINOIS, ASSIGNOR OF ONE-THIRD TO WILLIAM L. DOGGETT AND ONE-THIRD TO ARTHUR M. DOGGETT, OF CHICAGO, ILLINOIS.

VEHICLE-TIRE.

No. 857,876.  Specification of Letters Patent.  Patented June 25, 1907.

Application filed November 30, 1906. Serial No. 345,595.

*To all whom it may concern:*

Be it known that I, JEAN B. DUMAIS, a citizen of the United States, residing at Chicago, in the county of Cook and State of Illinois, have invented certain new and useful Improvements in Vehicle-Tires, of which the following is a specification.

The object of this invention is the production of means for protecting the inner tube from wear and accidental injury.

In the accompanying drawings, Figure 1 is a perspective view of a protective casing for an inner tube, embodying the features of my invention. Fig. 2 is a transverse sectional view through a vehicle tire comprising said protective casing. In the last-mentioned figure the thickness of the protective casing is much exaggerated for the sake of clearness. Fig. 3 is a fragmental view illustrating the manner of forming said casing.

In the drawings, 1 refers to the vehicle rim, 2 to the outer casing of the tire and 3 to the inner tube, all of which parts may be of any common or preferred construction. The inner tube 3 is inclosed within a protective casing 4, which may be advantageously formed in the following described manner: A strip 5 of suitable material, such as canvas, is spirally wound around a suitable form, as for instance a ring, said canvas being coated upon one side with an adhesive rubber compound. A strip 6 of rubber is then placed about the outer periphery of the tube formed by the spirally-wound strip 5. The width of the rubber strip 6 may be about five-twelfths of the circumference of said tube. I may, in some instances, cover the entire tube with a layer of rubber, in which case said layer would be applied in the form of a spirally-wound strip. Over the strips 5 and 6 is spirally wound a second strip 7 of suitable material, such as canvas, the strips 5 and 7 being wound in opposite directions. The various layers of canvas and rubber are then vulcanized together, and the inner periphery of the casing slitted in order to allow it to be removed from the form, and to provide means for inserting the inner tube 3. The edge portions of the casing 4 are secured together by means of laces 8 passed through eyelets 9 set in the edges of said casing. The inner tube 3 is protected from wear through contact with the laces 8 and eyelets 9, from being forced through the eyelets and broken by the air pressure, and from being pinched between the edges of the casing when the latter is being laced up, by means of a flap 10, said flap preferably being attached to the casing 4 by means of an attaching portion 11, which attaching portion may be wide enough to extend around the inner side of the casing 4 to the side opposite to that to which the flap 10 is attached, thus forming an extra protective layer or tread. The attaching portion 11 is cemented or otherwise suitably secured to the casing 4. The flap 10 preferably is formed integral with the attaching portion 11, and may consist of three thicknesses of material cemented or otherwise secured together, as shown in Fig. 2. The thickness of the flap 10, as illustrated in said figure, is considerably exaggerated. In practice the flap 10 with its attaching portion is placed upon the form hereinbefore referred to and attached to the casing in the process of making said casing.

The flap 10 is provided with an opening (not shown) through which the air valve 12 of the inner tube extends, the edges of the casing 4 being notched, as at 13, to receive said valve between them.

About the outer periphery of the casing 4 is cemented a strip 14 of suitable material, such as canvas, the width of said strip preferably being about five-twelfths of the circumference of the casing 4. This strip serves to increase the thickness of said protective casing at the point where punctures and other accidental injuries are most likely to occur.

The casing hereinbefore described is well adapted to resist the stresses to which it may be subjected in use. When applied to the driving wheels of an automobile, the tire is subjected to wrenching stresses which tend to cause the inner and outer peripheral portions of the casing to move with reference to each other. I have found that forming the casing of two strips of material wound spirally one upon the other in opposite directions imparts to the casing a considerable degree of elasticity and enables it to withstand the wrenching stresses referred to.

It will be understood that the surface of the spiral windings are not perfectly smooth, due to overlapping of the windings and to the texture of the material itself. The rubber layer 6 serves flexibly to unite the inner surface of the outer winding to the outer surface of the inner winding, thereby permitting of a slight yielding movement between said parts when varying stresses are applied thereto, also keeping said uneven surfaces out of contact with each other and thus preventing wear. In practice the rubber layer 6 will be about one-sixteenth of an inch in thickness.

I claim as my invention:

1. A removable protective casing for inner tubes, said protective casing being formed by spirally winding two strips of material one upon the other in opposite directions, said strips being secured together, the tubular casing thus formed being longitudinally slitted.

2. A removable protective casing for inner tubes, formed by spirally winding two strips of textile material, one upon the other, in opposite directions, a layer of rubber being interposed between said strips, all of the layers thus formed being secured together, the tubular casing thus formed being longitudinally slitted.

3. A removable protective casing for inner tubes, formed by spirally winding two strips of material one upon the other in opposite directions, said strips being secured together, the tubular casing thus formed being longitudinally slitted and a strip extending about the outer periphery of said casing and secured thereto.

4. A removable protective casing for inner tubes formed by spirally winding two strips of textile material one upon the other in opposite directions, a layer of rubber being interposed between said strips, all of the layers thus formed being secured together, the annular tubular casing thus formed being longitudinally slitted in its rim portion, means for closing the edges of the slit portion, a flap adapted to extend across said slit and protect the inner tube from said closing means, said flap having an attaching portion extending inside the tread portion of the casing, and a tread strip extending about the tread portion of the casing and secured thereto.

JEAN B. DUMAIS.

Witnesses:
L. L. MILLER,
GEORGE L. CHINDAHL.